United States Patent Office 3,471,804
Patented Oct. 7, 1969

3,471,804
FREQUENCY STABILIZED LASER
William B. Bridges, Thousand Oaks, and Adrian E. Popa, Canoga Park, Calif., assignors to Hughes Aircraft Company, Culver City, Calif., a corporation of Delaware
Filed May 9, 1967, Ser. No. 637,132
Int. Cl. H01s 3/10
U.S. Cl. 331—94.5    9 Claims

ABSTRACT OF THE DISCLOSURE

This invention relates to a frequency stabilized laser comprising a tunable frequency laser oscillator having an output coupled to a line shifting cell in such a manner that samples of the output of the laser oscillator propagate in opposite directions through the cell before being separately but simultaneously detected. The line shifting cell has the property of shifting the line center frequency in opposite directions of optical frequency energy propagating in opposite directions through the cell. After the detection, the output signals from the detectors are compared to provide an error signal that may be amplified before being coupled to the laser oscillator for tuning purposes.

---

The need for and advantages of a stabilized source of oscillations is well known in the radio frequency (RF) electromagnetic energy art. The need for and advantages of such a source of oscillations also applies to the much higher near optical and optical frequency range generators such as lasers, for example, but is much more difficult to attain. A stabilized laser oscillator is extremely useful in a linear measurement system, for example, and also has many advantageous metrological applications. Furthermore, it can be used as a source to make accurate gain linewidth measurements and investigations of single atom coherence effects in lasers.

Ordinary electronic RF oscillators are usually stabilized by referencing to some stable controlling element such as a piezoelectric crystal. The crystal oscillator is intrinsically orders of magnitude more stable than the frequency determining elements in the oscillator, such as LC circuit parameters. The problem with optical oscillators is that there are no known frequency determining elements related to lasers as crystals are related to LC oscillators. One drawback of most laser oscillators to date is that the actual oscillation frequency is determined to the first order by the cavity spacing. This means that such a laser oscillator capable of extremely high purity frequency output over a long time period is limited by the mechanical stability of the cavity. The two principal causes of mechanical instability are microphonics, including acoustic effects, and thermal drift. A third possible source of drift is atmospheric pressure changes which can be neglected here since it can easily be eliminated by conventional means.

The usual way to stabilize a laser oscillator has been to isolate it from thermal and mechanical shock. Usually this involves immersing the laser cavity in as nearly a constant temperature bath as possible, such as a controlled temperature and humidity room and mounting the laser cavity on a vibration-free and isolated platform, sometimes located underground. The cavity mirrors have also been mounted internally with respect to the laser in order to remove fluctuations due to perturbations in the cavity, such as scattering from dust particles, etc., that afflict Brewster angle lasers with externally mounted mirrors, for example. Generally, isolation methods have proved to be impractical for most applications.

Feedback systems have also been used in an effort to obtain satisfactory stabilization. In an early attempt to gain the desired goal, a servo system was devised to keep the total output intensity at a maximum. However, this technique proved to be too insensitive to stabilize the oscillator to within better than some tens of megacycles. Later, experiments were conducted where an error signal was produced by oscillating one of the reflectors comprising the resonant cavity of the laser at an audio rate and directing a portion of the laser output beam at a photodetector, the output of which was phase detected to provide a DC voltage proportional to the derivative of the curve of output power plotted against frequency. The laser output was then locked to one of three zero slope points resulting from a center tuning dip by properly applying this feedback energy to the oscillating reflector. The drawback here was that the laser beam was frequency modulated.

Subsequently, a much improved scheme was devised that derived the error signal from the laser transition's absorption- or gain-frequency profile. The former of these is preferred since the absorption can be made larger than the gain for a given length of discharge. The error signal was formed by having the output beam of a laser explore the absorption-frequency profile. Here, the absorption line profile is either split or shifted symmetrically about the transition center frequency. This method uses a switch in the optical path, such as a switched KDP polarizer or a switch absorption cell, to sample the two halves of the error signal or discriminant alternately. The switching requirement imposes an objectionable upper limit on the frequency of the jitter in the optical output that can be stabilized by this method.

In contrast to the prior laser stabilization art as above described, the invention has the advantage of eliminating the need for a switching element and provides instead two optical paths that continuously measure the two halves of the frequency discriminant.

It is therefore an object of the present invention to provide an improved stabilized laser oscillator.

It is another object of the invention to provide a stabilized laser oscillator that does not incorporate a switching element in the optical path.

It is still another object of the present invention to provide a simpler, cheaper and easier to implement stabilized laser oscillator wherein the upper limit on the frequency jitter is extended.

These and other objects of the invention are obtained, according to one embodiment of the invention, in a frequency stabilized laser utilizing a controllable frequency laser oscillator capable of producing at least one output beam of optical frequency energy. A sample of the output optical frequency energy from the laser is coupled into opposite ends of a line shifting cell wherein the energy is propagated in opposite directions and thereafter separately detected and then continuously compared. The line shifting cell has the property of shifting the line center frequency in opposite directions of optical frequency energy propagating in opposite directions through the cell. Whenever there is a difference in amplitude detected between the oppositely propagating optical frequency energy, an error signal is provided which in turn is amplified and then coupled to the controllable frequency laser in order to change the frequency of the output energy in a direction to cancel the error signal.

The invention and specific embodiments thereof will be described hereinafter by way of example and with reference to the accompanying drawings wherein like reference numerals refer to like elements or parts and in which.

Figure 4:
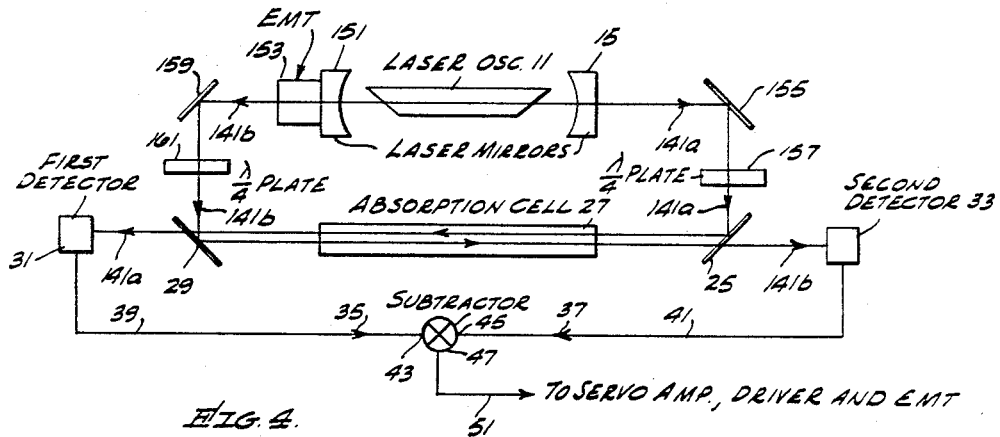
Figure 5:
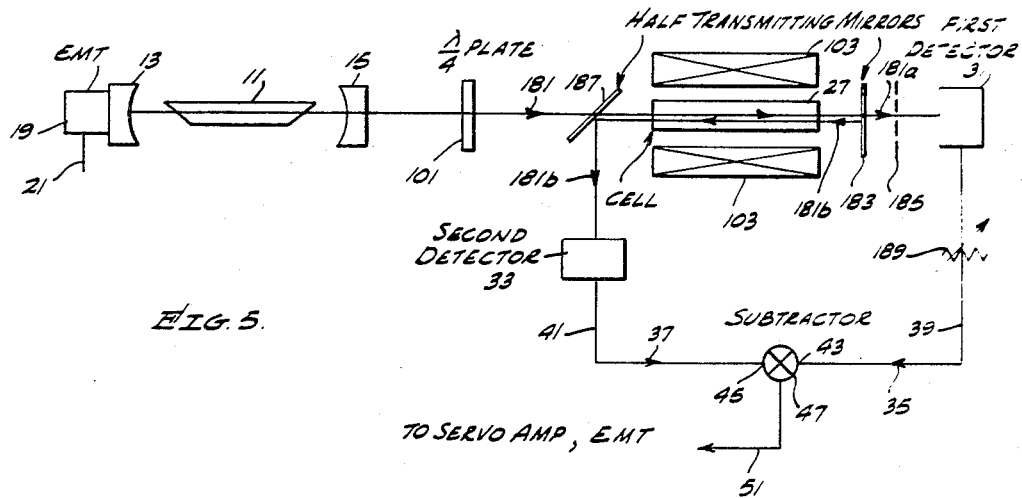

FIG. 4 illustrates another embodiment of the invention in which a laser producing two output beams of optical energy may be used to provide optical output energy propagation in opposite directions through a line shifting cell; and FIG. 5 is a schematic diagram of an embodiment of the invention in which still another optical configuration is used to provide contra propagating optical frequency energy through a line shifting cell and in which a balancing provision is incorporated.

Figure 1:
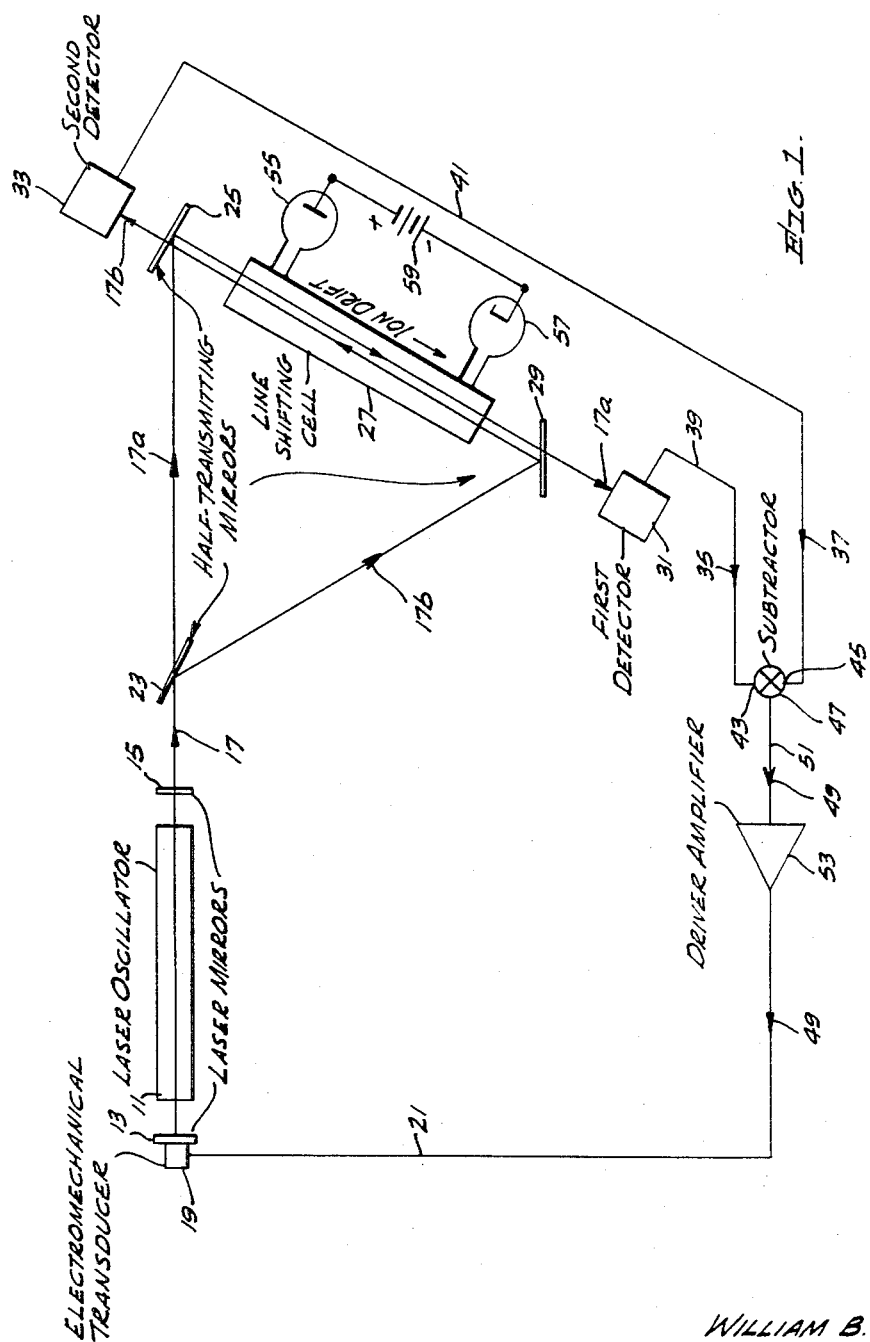
FIG. 1 is a schematic diagram of a preferred embodiment of the invention in which a Doppler effect cell is utilized in conjunction with a beam splitter optical system.

With reference now to the drawings and more particularly to FIG. 1, there is shown a laser oscillator 11 including a substantially totally reflective mirror 13 and a partially transmissive mirror 15 through which optical energy output beam indicated by line 17 is transmitted. An electromechanical transducer 19 of PZT, lead zirconium titanate, or other material having similar properties is attached to the reflective mirror 13 so that the frequency of oscillation of the laser and consequently the frequency of the output optical frequency energy 17 is changed in accordance with the voltage or signal applied to the transducer 19 through its input line 21.

As can be seen, the output beam 17 is split by a first half-transmitting mirror 23 to provide two sample components of approximately equal magnitude; a transmitted component 17a and a reflected component 17b. The transmitted component 17a is reflected by a second half-transmitting mirror 25 and is thereby caused to travel through a line shifting cell 27 and a third half-transmitting mirror 29 and detected by a first detector 31. The reflected component, on the other hand, is reflected by the third half-transmitting mirror 29 through the line shifting cell 27 in the opposite direction from the transmitted component 17a and through the second half-transmitting mirror 25 and is detected by a second detector 33.

The first and second detectors 31 and 33 may be simple photodetectors or photomultipliers and provide first and second detector output signals represented by arrows 35 and 37, respectively, that are coupled by first and second output lines 38 and 41 to first and second input terminals 43 and 45, respectively, or a subtractor 47. The subtractor 47 may simply be a terminal board whereat the output signals from the detectors are combined in a series-opposing relationship or it can take the form of an isolation amplifier for example. It provides an error signal, as indicated by arrow 49, that is coupled to a driver-amplifier 53 by a subtractor output line 51. The function of the driver-amplifier 53 is to amplify the error signal 49 and provide proper impedance and power relationships in order to efficiently drive the transducer. Of course, the driver-amplifier may be two or more separate units.

Figure 2:
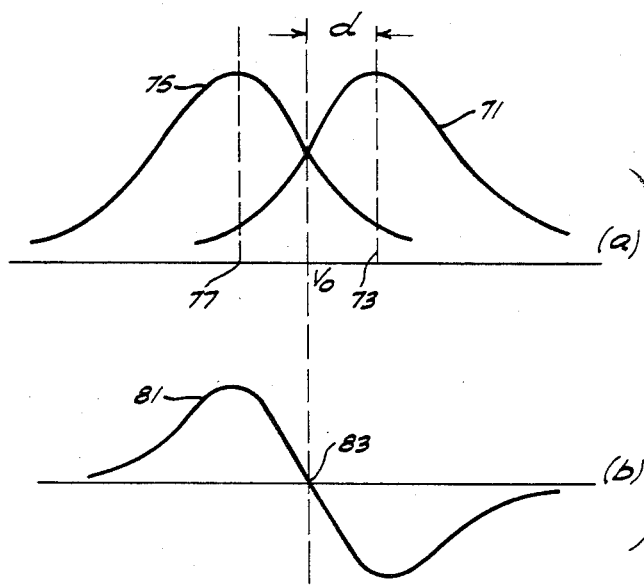
FIG. 2 illustrates graphic representations of the detector output signals.

The operation of the invention may best be explained by making reference to FIG. 2(a) which shows a composite absorption profile as viewed simultaneously at the output terminals of both detectors 31 and 33. The curve 71, having a center frequency represented by dashed line 73, represents the absorption experienced by light traveling along path 17a and the curve 75, having a center frequency at dashed line 77, represents the absorption experienced by light traveling along path 17b. It should be noted that the center line frequency of each component of absorption is shifted from its original center frequency, $\nu_0$, by the same amount but in different directions.

When the DC detector output signals 35 and 37 are simultaneously presented to the subtractor 47, an algebraic subtraction takes place and an error signal 49 is produced by the subtractor, the magnitude of which will be zero for a frequency at $\nu_0$ and will increase in opposite directions for frequencies above and below this original line center frequency. The error signal 49 has a characteristic discriminator S-configuration as a function of frequency and is shown in FIG. 2(b). Thus, in operation, when the frequency of the laser oscillator 11 deviates in either direction from its original line center frequency, $\nu_0$, a DC error signal 49 will be produced, having a magnitude dependent upon the amount of deviation and a polarity dependent upon the direction of deviation. This error signal is first amplified and then coupled to the electromechanical transducer 19 in order to change the length of the regenerative path between the mirrors 13 and 15 and thus change the frequency of oscillation in an amount and direction to return the output beam frequency of the laser 11 to $\nu_0$. Of course, an integration amplifier may also be incorporated in this feedback loop in order to provide a more precise null-seeking arrangement.

Figure 3:
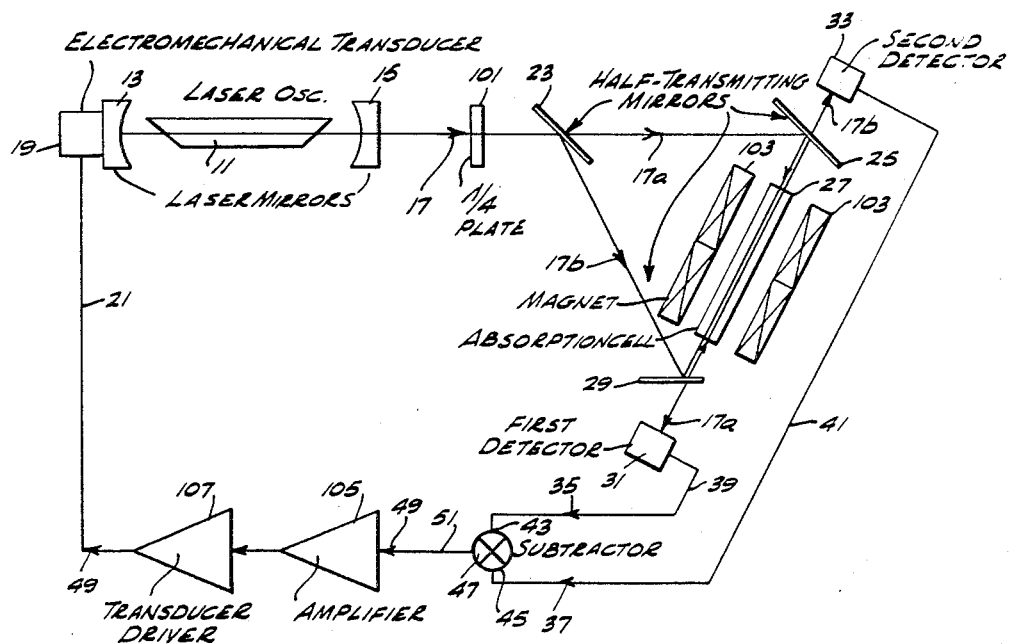
FIG. 3 is a schematic illustration of an embodiment of the invention wherein a Zeeman effect cell is incorporated.

The embodiment of the invention shown in FIG. 1 incorporates a Doppler effect type line shifting cell 27 and will operate with either a circularly polarized beam or a linearly plane polarized beam 17 such as from an ion laser as a laser oscillator 11. In order to provide an error signal, the line shifting Doppler effect cell 27 has an ion drift from an anode end 55 of the cell toward the cathode 57 thereof because of the proper connection of a battery 59 to these electrodes. With this configuration, the two components 17a and 17b of the output beam 17 are continuously measured with respect to the gas velocity within the cell. Thus, the curve 71 will represent oncoming ions and the curve 75, receding ions and the difference, $d$, between $\nu_0$ and the center frequency of either of the two curves 71 or 75 is $$d = \frac{\nu \text{ drift}}{C} \nu_0$$

where C is the speed of light. On the other hand, the line shifting cell 27 may be the Zeeman type that requires circularly polarized light to operate effectively. In this case, the laser 11 may be of the type producing circularly polarized light or one that produces predominantly plane polarized light but which then necessitates the use of quarter-wave plates such as shown in FIG. 3 to provide circularly polarized light at the cell 27. In this embodiment, a quarter-wave plate 101 is disposed in the path of the output beam 17 before the beam is split into components by the mirror 23. The components 17a and 17b are then caused to propagate through the line shifting cell 27 in opposite directions as was the case of the embodiment of FIG. 1. In the embodiment of FIG. 3, the desired descriminator S-configuration is provided by a Zeeman-type cell 27 incorporating an energized coil 103 surrounding the cell so that the two halves of the frequency discriminant may be continuously measured. This embodiment in other respects operates in the same manner as the embodiment described with respect to FIG. 1.

FIG. 4 illustrates an embodiment of the invention wherein the laser oscillator 11 is of the type producing output beams from both ends thereof. Since the laser oscillator 11 is shown to have Brewster angle windows, plane polarized energy in the form of a right output component 141a and a left output component 141b is produced. The laser in this embodiment incorporates a partially transmissive mirror 151 and an electromechanical transducer 153 which is attached to the mirror 151 and is adapted to change the distance between the mirror 15 and the mirror 151 in accordance with a voltage applied thereto. The right output component 141a is shown reflected by an opaque mirror 155 and passes through a quarter-wave plate 157 before being reflected by the half-transmitting mirror 25. After being thus reflected, the component 141a passes through a Zeeman-type line shifting absorption cell 27 (the coil surrounding the cell 27 not being shown) and through the half-transmitting mirror 29 and before being detected by the first detector 31. As to the left component 141b, it is first reflected by an opaque mirror 159 and then passes through a quarter-wave plate 161 before being reflected by the half-transmitting mirror 29. Thereafter, this component propagates through the cell 27 and the mirror 25 and is thereafter detected by the second detector 33. The subtractor output line 51, though not shown specifically in this figure, may carry the error signal 49 to a servo amplifier and driver circuitry to the electromechanical transducer 153, here designated EMT.

Still another embodiment of the invention is shown in FIG. 5. Here, the laser oscillator 11 produces a plane polarized output beam 181 that passes through the quarter-wave plate 101, a half-transmitting mirror 187, and a Zeeman-type line shifting cell 27 before impinging on a half-transmitting mirror 183. The mirror 183 allows a portion of the output beam 181 to pass therethrough (181a) and be detected by the first detector 31. An optical attenuation segment 185 is shown disposed to intercept this transmitted component 181a for balancing purposes to be described later. Also, an electrical attenuation element 189 may be used for the same purpose. The component of output beam 181 which is reflected by the half-transmitting mirror 183, herein designated 181b, is directed to propagate back through the cell 27 and is reflected by the half-transmitting mirror 187 and detected thereafter by the second detector 33. When the laser oscillator 11 oscillates at $\nu_0$, the optical or electrical attenuation element 185 or 189 is adjusted so that the output signals from the first and second detectors 31 and 33 are equal in magnitude and opposite in polarity so that the error signal produced by the subtractor 47 is made to be zero. Again, in all other respects, this embodiment functions in much the same manner as the embodiment shown and described in FIG. 1. In any of the embodiments shown, an attenuation element may be used in one of the paths in order to shift $\nu_0$.

It should be obvious that the embodiments shown in FIG. 5 as well as those of FIGS. 3 and 4 may incorporate laser oscillators that produce circularly polarized light by the deletion of the quarter-wave plates.

From the foregoing, it should be seen that the invention provides an improved stabilized laser oscillator that is simpler, cheaper, and easier to implement than heretofore available and that does not incorporate a switching element in the optical path that would limit the frequency of the jitter in the optical output that can be stabilized.

In practicing the invention, any laser oscillator configuration may be substituted for the laser oscillator 11 described herein whether a solid, gas or solid-state device. It should also be understood that any element which exhibits the same characteristic as described for the line shifting cell 27 may be substituted therefor.

It is intended that the foregoing disclosure and drawings shall be considered only as illustrations of the principles of this invention and are not to be construed in a limiting sense.

What is claimed is:
1. A frequency stabilized laser comprising:
  a laser oscillator capable of producing at least one output beam of optical frequency energy, said oscillator including frequency controlling means for controlling the oscillating frequency of said oscillator;
  a line shifting cell having the property of shifting the line center frequency in opposite directions of optical frequency energy propagating in opposite directions through said cell;
  coupling means coupled to said output optical frequency energy and to said cell for propagating a sample of said energy in opposite directions through said cell; and
  comparing means coupled to said cell for continuously comparing the energy that has propagated in opposite directions through said cell and coupled to said frequency controlling means to provide a direct current error signal thereto whenever there is a difference in amplitude between the oppositely propagating optical frequency energy for changing the frequency of said output energy in a direction to cancel said error signal.

2. A frequency stabilized laser comprising:
  a laser oscillator capable of producing at least one output beam of optical frequency energy, said oscillator including frequency controlling means for controlling the oscillating frequency of said oscillator;
  a line shifting cell having the property of shifting the line center frequency in opposite directions of optical frequency energy propagating in opposite directions through said cell;
  coupling means coupled to said output optical frequency energy and to said cell for propagating a sample of said energy in opposite directions through said cell;
  comparing means including a pair of photodetectors optically coupled to said cell for continuously comparing the energy that has propagated in opposite directions through said cell and including an algebraic comparator element coupled to said photodetectors to provide a direct current error signal whenever there is a difference in phase between the oppositely propagating optical frequency energy; and
  stabilizing means coupled to said comparing means and to said frequency controlling means and responsive to said error signal for changing the frequency of said output energy in a direction to cancel said error signal.

3. A frequency stabilizer laser comprising:
  a laser oscillator capable of producing at least one output beam of plane polarized optical frequency energy, said oscillator including frequency controlling means for controlling the oscillating frequency of said oscilator;
  a Doppler effect line shifting cell having the property of shifting the line center frequency in opposite directions of optical frequency energy propagating in opposite directions through said cell;
  coupling means coupled to said plane polarized output optical frequency energy and to said cell for propagating a sample of said energy in opposite directions through said cell;
  comparing means coupled to said cell for continuously comparing the energy that has propagated in opposite directions through said cell and to provide a direct current error signal whenever there is a difference in phase between the oppositely propagating optical frequency energy; and
  stabilizing means coupled to said comparing means and to said frequency controlling means and responsive to said error signal for changing the frequency of said output energy in a direction to cancel said error signal.

4. A frequency stabilized laser comprising:
  a laser oscillator capable of producing at least one output beam of circularly polarized optical frequency energy said oscillator including frequency controlling means for controlling the oscillating frequency of said oscillator;
  a Doppler effect line shifting cell having the property of shifting the line center frequency in opposite directions of optical frequency energy propagating in opposite directions through said cell;

coupling means coupled to said circularly polarized output optical frequency energy and to said cell for propagating a sample of said energy in opposite directions through said cell, said coupling means including quarter-wave plate means disposed in the path of said output frequency energy for converting said circularly polarized energy to linearly polarized energy before propagation through said cell;

comparing means coupled to said cell for continuously comparing the energy that has propagated in opposite directions through said cell and to provide a direct current error signal whenever there is a difference in phase between the oppositely propagating optical frequency energy; and stabilizing means coupled to said comparing means and to said frequency controlling means and responsive to said error signal for changing the frequency of said output energy in a direction to cancel said error signal.

5. A frequency stabilized laser comprising:

a laser oscillator capable of producing at least one output beam of circularly polarized optical frequency energy, said oscillator including frequency controlling means for controlling the oscillating frequency of said oscillator;

a Zeeman type line shifting cell having the property of shifting the line center frequency in opposite directions of optical frequency energy propagating in opposite directions through said cell;

coupling means coupled to said circularly polarized output optical frequency energy and to said cell for propagating a sample of said energy in opposite directions through said cell;

comparing means coupled to said cell for continuously comparing the energy that has propagated in opposite directions through said cell and to provide a direct current error signal whenever there is a difference in phase between the oppositely propagating optical frequency energy; and stabilizing means coupled to said comparing means and to said frequency controlling means and responsive to said error signal for changing the frequency of said output energy in a direction to cancel said error signal.

6. A frequency stabilized laser comprising:

a laser oscillator capable of producing at least one output beam of plane polarized optical frequency energy, said oscillator including frequency controlling means for controlling the oscillating frequency of said oscillator;

a Zeeman type line shifting cell having the property of shifting the line center frequency in opposite directions of optical frequency energy propagating in opposite directions through said cell;

coupling means coupled to said plane polarized output optical frequency energy and to said cell for propagating a sample of said energy in opposite directions through said cell, said coupling means including quarter-wave plate means disposed in the path of said output frequency energy for converting said plane polarized energy to circularly polarized energy before propagation through said cell;

comparing means coupled to said cell for continuously comparing the energy that has propagated in opposite directions through said cell and to provide a direct current error signal whenever there is a difference in phase between the oppositely propagating optical frequency energy; and stabilizing means coupled to said comparing means and to said frequency controlling means and responsive to said error signal for changing the frequency of said output energy in a direction to cancel said error signal.

7. A frequency stabilized laser comprising:

a laser oscillator capable of producing an output beam of optical frequency energy, said oscillator including frequency controlling means for controlling the oscillating frequency of said oscillator;

a line shifting cell having the property of shifting the line center frequency in opposite directions of optical frequency energy propagating in opposite directions through said cell;

coupling means including a first half-transmitting mirror coupled to said output beam to split said output energy into two equal components and second and third half-transmitting mirrors each coupled to different ones of said components for propagating a sample of said energy in opposite directions through said cell;

comparing means coupled to said cell for continuously comparing the energy that has propagated in opposite directions through said cell and to provide a direct current error signal whenever there is a difference in phase between the oppositely propagating optical frequency energy; and stabilizing means coupled to said comparing means and to said frequency controlling means and responsive to said error signal for changing the frequency of said output energy in a direction to cancel said error signal.

8. A frequency stabilized laser comprising:

a laser oscillator capable of producing two output beams of optical frequency energy, said oscillator including frequency controlling means for controlling the oscillating frequency of said oscillator;

a line shifting cell having the property of shifting the line center frequency in opposite directions of optical frequency energy propagating in opposite directions through said cell;

coupling means coupled to each of said two output beams and to said cell for propagating each of said two beams in opposite directions through said cell;

comparing means coupled to said cell for continuously comparing the energy that has propagated in opposite directions through said cell and to provide a direct current error signal whenever there is a difference in phase between the oppositely propagating optical frequency energy; and stabilizing means coupled to said comparing means and to said frequency controlling means and responsive to said error signal for changing the frequency of said output energy in a direction to cancel said error signal.

9. A frequency stabilized laser comprising:

a laser oscillator for producing an output beam of optical frequency energy, said oscillator including frequency controlling means for controlling the oscillating frequency of said oscillator;

a line shifting cell having the property of shifting the line center frequency in opposite directions of optical frequency energy propagating in opposite directions through said cell;

coupling means coupled to said output beam and to said cell for propagating a sample of said energy in opposite directions through said cell, said coupling means including a first half-transmitting mirror through which said output beam first propagates before traversing said cell, a second half-transmitting mirror intercepting the output energy after traversing said cell and reflecting a portion of said output energy back through said cell to be reflected by said first half-transmitting mirror;

comparing means including a pair of photo-detectors one of which is coupled to the output energy propagating through said second half-transmitting mirror and the other of which is coupled to the energy reflected by said first half-transmitting mirror for continuously comparing the energy that has propagated in opposite directions through said cell and to provide a direct current error signal whenever there is a difference in phase between the oppositely propagating optical frequency energy; and stabilizing means coupled to said comparing means and to said frequency controlling means and responsive to said error signal for changing the frequency of said output energy in a direction to cancel said error signal.

References Cited

UNITED STATES PATENTS 3,361,990   1/1968   Gordon et al. _____ 331—94.5

RONALD L. WIBERT, Primary Examiner

PAUL K. GODWIN, Assistant Examiner